(12) United States Patent
Crawford et al.

(10) Patent No.: US 11,386,061 B2
(45) Date of Patent: Jul. 12, 2022

(54) TELEMETRY REQUEST SYSTEM

(71) Applicant: Microsoft Technology Licensing, LLC, Redmond, WA (US)

(72) Inventors: Brian R. Crawford, Seattle, WA (US); Amy M. Lewis, Sammamish, WA (US); Mahmood G. Qadir, Redmond, WA (US); Ravi C. Shahani, Bellevue, WA (US); Wojtek Kozaczynski, Duvall, WA (US); Brian P. Ellis, Sammamish, WA (US); George Joy, Kirkland, WA (US); James O. Todd, Redmond, WA (US); Ken Ming-Kin Yip, Bellevue, WA (US); Mark E. Russinovich, Hunts Point, WA (US); William M. Zintel, Woodinville, WA (US); Vitaliy Titov, Redmond, WA (US); Tae Hyung Kim, Seoul (KR); Vito J. Sabella, Bellevue, WA (US); Christopher M. Lang, Bellevue, WA (US); Jonathan K. Johnson, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 155 days.

(21) Appl. No.: 14/885,971

(22) Filed: Oct. 16, 2015

(65) Prior Publication Data

US 2017/0109380 A1    Apr. 20, 2017

(51) Int. Cl.
*G06F 16/00* (2019.01)
*G06F 16/22* (2019.01)
(Continued)

(52) U.S. Cl.
CPC .......... *G06F 16/22* (2019.01); *G06F 11/3006* (2013.01); *G06F 11/3072* (2013.01);
(Continued)

(58) Field of Classification Search
CPC .......... G06F 17/30312; G06F 11/3006; G06F 17/30377; G06F 2201/86; G06F 2201/865;
(Continued)

(56) References Cited

U.S. PATENT DOCUMENTS 6,263,268 B1    7/2001 Nathanson
6,338,011 B1    1/2002 Furst et al.
(Continued)

FOREIGN PATENT DOCUMENTS

CN    101102535 A    1/2008
CN    101320350 A    12/2008
(Continued)

OTHER PUBLICATIONS

Office Action for U.S. Appl. No. 14/885,970 dated Nov. 24, 2017 (42 pgs.).
(Continued)

*Primary Examiner* — Noosha Arjomandi
(74) *Attorney, Agent, or Firm* — Workman Nydegger

(57) ABSTRACT

A method of operating a telemetry system includes automatically populating a first set of fields in a schema of an event definition using a logging library of the telemetry system, and receiving the set of fields via a request message in an application protocol.

20 Claims, 5 Drawing Sheets

(51) Int. Cl.
*G06F 16/23* (2019.01)
*G06F 11/30* (2006.01)

(52) U.S. Cl.
CPC ...... *G06F 16/2379* (2019.01); *G06F 11/3082* (2013.01); *G06F 2201/86* (2013.01); *G06F 2201/865* (2013.01)

(58) Field of Classification Search
CPC ............... G06F 17/30386; G06F 16/22; G06F 16/2379; G06F 16/24; G06F 11/3072; G06F 11/3082
See application file for complete search history.

(56) References Cited

U.S. PATENT DOCUMENTS

| | | | |
|---|---|---|---|
| 6,393,423 B1* | 5/2002 | Goedken | G06F 16/951 |
| | | | 707/999.005 |
| 6,449,618 B1* | 9/2002 | Blott | G06F 16/24568 |
| 6,920,461 B2* | 7/2005 | Hejlsberg | G06F 9/46 |
| 7,970,890 B1 | 6/2011 | Krivopaltsev et al. | |
| 8,547,246 B2 | 10/2013 | Menezes et al. | |
| 8,601,155 B2 | 12/2013 | Toombs et al. | |
| 8,898,178 B2 | 11/2014 | Kyomasu et al. | |
| 8,953,600 B2 | 2/2015 | Groves, Jr. | |
| 9,038,014 B2 | 5/2015 | Sivaramakrishnan et al. | |
| 9,055,030 B2 | 6/2015 | Field et al. | |
| 2002/0174191 A1* | 11/2002 | Robertson | H04L 63/123 |
| | | | 709/217 |
| 2003/0162523 A1 | 8/2003 | Kapolka et al. | |
| 2004/0044493 A1* | 3/2004 | Coulthard | G06Q 10/10 |
| | | | 713/300 |
| 2004/0255301 A1* | 12/2004 | Turski | G06F 16/289 |
| | | | 718/108 |
| 2005/0223366 A1 | 10/2005 | Smith et al. | |
| 2006/0047545 A1 | 3/2006 | Kumar et al. | |
| 2006/0161460 A1 | 7/2006 | Smitherman et al. | |
| 2006/0206698 A1 | 9/2006 | Foucher et al. | |
| 2007/0006174 A1 | 1/2007 | Sohm et al. | |
| 2007/0142008 A1 | 6/2007 | Bedenko | |
| 2007/0294208 A1 | 12/2007 | Chowdhary et al. | |
| 2008/0276131 A1 | 11/2008 | Bantz et al. | |
| 2008/0320012 A1 | 12/2008 | Loving et al. | |
| 2009/0010235 A1 | 1/2009 | Huh et al. | |
| 2010/0194588 A1 | 8/2010 | Menezes et al. | |
| 2011/0087767 A1 | 4/2011 | Sonkin et al. | |
| 2011/0238812 A1* | 9/2011 | Vaught | H04L 67/20 |
| | | | 709/223 |
| 2012/0117116 A1 | 5/2012 | Jacobson et al. | |
| 2012/0245715 A1* | 9/2012 | Short | A63F 13/35 |
| | | | 700/91 |
| 2013/0036404 A1* | 2/2013 | Shu | G06F 11/3676 |
| | | | 717/127 |
| 2013/0066448 A1 | 3/2013 | Alonso | |
| 2013/0081065 A1 | 3/2013 | Sharan et al. | |
| 2013/0117011 A1 | 5/2013 | Ahmed et al. | |
| 2013/0125096 A1 | 5/2013 | Kruetzfeldt et al. | |
| 2014/0047064 A1 | 2/2014 | Maturana et al. | |
| 2014/0075506 A1 | 3/2014 | Davis et al. | |
| 2014/0137240 A1 | 5/2014 | Smith et al. | |
| 2014/0156520 A1 | 6/2014 | Kelly et al. | |
| 2014/0298107 A1 | 10/2014 | Dreyfoos et al. | |
| 2014/0317454 A1 | 10/2014 | Gataullin et al. | |
| 2014/0344269 A1 | 11/2014 | Dong et al. | |
| 2014/0380282 A1 | 12/2014 | Ravindranath Sivalingam et al. | |
| 2015/0046512 A1* | 2/2015 | Ashby | H04L 43/08 |
| | | | 709/203 |
| 2015/0095298 A1 | 4/2015 | Mann | |
| 2015/0193477 A1 | 7/2015 | Dumant et al. | |
| 2015/0339388 A1 | 11/2015 | Carlson et al. | |
| 2015/0339570 A1* | 11/2015 | Scheffler | G06N 3/10 |
| | | | 706/27 |
| 2017/0011177 A1* | 1/2017 | Corpier | A61B 5/0022 |
| 2017/0109259 A1* | 4/2017 | Lewis | G06F 11/3006 |
| 2017/0109379 A1* | 4/2017 | Crawford | G06F 16/2379 |
| 2017/0109380 A1* | 4/2017 | Crawford | G06F 11/3072 |
| 2017/0116068 A1* | 4/2017 | Damron | H04L 41/069 |
| 2017/0187782 A1 | 6/2017 | Crawford et al. | |
| 2017/0228447 A1* | 8/2017 | Catania | G06F 16/26 |
| 2021/0173761 A1 | 6/2021 | Lewis et al. | |

FOREIGN PATENT DOCUMENTS

| | | |
|---|---|---|
| CN | 102256290 A | 11/2011 |
| CN | 102664749 A | 9/2012 |
| CN | 102685182 | 9/2012 |
| CN | 102999418 A | 3/2013 |
| CN | 103348598 A | 10/2013 |
| CN | 103795711 A | 5/2014 |
| CN | 104092575 A | 10/2014 |
| CN | 104598369 A | 5/2015 |
| WO | 03009250 A1 | 1/2003 |
| WO | 2014020612 A1 | 2/2014 |

OTHER PUBLICATIONS

"International Search Report & Written Opinion Issued in PCT Application No. PCT/US2016/056226", dated Feb. 3, 2017, 12 Pages.
"International Search Report & Written Opinion Issued in PCT Application No. PCT/US2016/056234", dated Feb. 2, 2017, 11 Pages.
Final Office Action for U.S. Appl. No. 14/885,969 dated Feb. 15, 2017 (21 pgs.).
"International Search Report & Written Opinion Issued in PCT Application No. PCT/US2016/056232", dated Feb. 13, 2017, 15 Pages.
"International Search Report & Written Opinion Issued in PCT Application No. PCT/US2016/056240", dated Feb. 2, 2017, 11 Pages.
Office Action for U.S. Appl. No. 14/885,969 dated Jun. 21, 2017 (27 pgs.).
Definition of Telemetry, Wikipedia, Oct. 31, 2011.
Final Office Action for U.S. Appl. No. 14/885,969 dated Oct. 20, 2017 (22 pgs.).
"Second Written Opinion Issued in PCT Application No. PCT/US2016/056232", dated Aug. 22, 2017, 7 Pages.
"Second Written Opinion Issued in PCT Application No. PCT/US2016/056234", dated Aug. 22, 2017, 5 Pages.
"Second Written Opinion Issued in PCT Application No. PCT/US2016/056240", dated Aug. 31, 2017, 6 Pages.
Second Written Opinion Issued in PCT Application No. PCT/US2016/056226, dated Sep. 1, 2017, 5 Pages.
"Overview of Office Telemetry", Published on: Feb. 23, 2013, 10 pages. Available at: https://web.archive.org/web/20130223054520/http://technet.microsoft.com/en-US/library/jj863580.aspx.
"[MS-TPXS]: Telemetry Protocol XML Schema", v20150630, Microsoft Corporation, Jun. 30, 2015, 23 Pages.
Kunic, Adnan, "Converting Mobile Client/Server Telemetry Acquisition System to Enterprise SOA Architecture", Retrieved on: Jul. 2, 2015, 9 pages. Available at: http://diabict.fer.hr/_download/repository/Adnan_Kunic_-_Kvalifikacijski_ispit.pdf.
Office Action for U.S. Appl. No. 14/885,969 dated Sep. 16, 2016 (13 pgs.).
"International Preliminary Report on Patentability Issued in PCT Application No. PCT/US2016/056234", dated Jan. 8, 2018, 6 Pages.
"International Preliminary Report on Patentability Issued in PCT Application No. PCT/US2016/056226", dated Jan. 8, 2018, 9 Pages.
"International Preliminary Report on Patentability Issued in PCT Application No. PCT/US2016/056232", dated Jan. 8, 2018, 9 Pages.
"International Preliminary Report on Patentability Issued in PCT Application No. PCT/US2016/056240", dated Jan. 15, 2018, 7 Pages.
"Log4j", Retrieved From: http://www.avajava.com/tutorials/lessons/what-is-log4j-and-how-do-i-use-it.html, Retrieved date: May 24, 2018, 3 Pages.

(56) References Cited

OTHER PUBLICATIONS

"Log4J", Retrieved From: https://en.wikipedia.org/w/index.php?title=Log4j&oldid=618338328, Jul. 24, 2014, 5 Pages.
"Non Final Office Action Issued in U.S. Appl. No. 14/885,969", dated May 31, 2018, 33 Pages.
"Final Office Action Issued in U.S. Appl. No. 14/885,970", dated Apr. 9, 2018, 30 Pages.
"Non Final Office Action Issued in U.S. Appl. No. 14/885,973", dated Jun. 28, 2018, 18 Pages.
"Final Office Action Issued in U.S. Appl. No. 14/885,969", dated Oct. 24, 2018, 38 Pages.
"Non Final Office Action Issued in U.S. Appl. No. 14/885,970", dated Oct. 5, 2018, 31 Pages.
"Non Final Office Action Issued in U.S. Appl. No. 14/885,969", dated Apr. 26, 2019, 16 Pages.
"Final Office Action Issued in U.S. Appl. No. 14/885,970", dated Jun. 3, 2019, 23 Pages.
"Non Final Office Action Issued in U.S. Appl. No. 14/885,973", dated May 31, 2019, 13 Pages.
"Final Office Action Issued in U.S. Appl. No. 14/885,973", dated Jan. 28, 2019, 13 Pages.
"Final Office Action Issued in U.S. Appl. No. 14/885,969", dated Aug. 23, 2019, 19 Pages.
"Non Final Office Action Issued In U.S. Appl. No. 14/885,970", dated Oct. 2, 2019, 27 Pages.
"Final Office Action Issued In U.S. Appl. No. 14/885,973", dated Oct. 24, 2019, 12 Pages.
Fielding, et al., "Hypertext Transfer Protocol—HTTP/1.1 RFC 2616", Retrieved from:https://dl.acm.org/citation.cfm?id=RFC2616, Jun. 1999, 114 Pages.
"Notice of Allowance Issued in U.S. Appl. No. 14/885,969", dated Mar. 11, 2020, 8 Pages.
"Final Office Action Issued in U.S. Appl. No. 14/885,970", dated Feb. 19, 2020, 29 Pages.
"Non Final Office Action Issued in U.S. Appl. No. 14/885,973", dated Apr. 6, 2020, 20 Pages.
"Office Action Issued in European Patent Application No. 16787652.3", dated Apr. 3, 2020, 6 Pages.
"Office Action Issued in U.S. Appl. No. 14/885,970", dated Jun. 26, 2020, 37 Pages.
"Office Action Issued in European Patent Application No. 16787966.7", dated Jun. 9, 2020, 5 Pages.
"Final Office Action Issued in U.S. Appl. No. 14/885,970", dated Nov. 30, 2020, 35 Pages.
"Office Action Issued in European Patent Application No. 16787654.9", dated Nov. 25, 2020, 5 Pages.
"Final Office Action Issued in U.S. Appl. No. 14/885,973", dated Oct. 19, 2020, 18 Pages.
"First Office Action and Search Report Issued in Chinese Patent Application No. 201680060563.7", dated Aug. 4, 2020, 15 Pages.
"First Office Action and Search Report Issued in Chinese Patent Application No. 201680059600 2", dated Aug. 5, 2020, 18 Pages.
"First Office Action and Search Issued in Chinese Patent Application No. 201680060249.9", dated Aug. 12, 2020, 28 Pages.
"Second Office Action and Search Report Issued In Chinese Patent Application No. 201680060563.7", dated Jan. 22, 2021, 11 Pages.
"Second Office Action and Search Report Issued in Chinese Patent Application No. 201680059600.2", dated Dec. 30, 2020, 14 Pages.
"Office Action Issued in Chinese Patent Application No. 201680059600.2", dated Apr. 8, 2021, 9 Pages.
"Second Office Action Issued in Chinese Patent Application No. 201680060249.9", dated Mar. 16, 2021, 5 Pages.
"Third Office Action Issued in Chinese Patent Application No. 201680060563.7", dated Jun. 2, 2021, 7 Pages.
"Non Final Office Action Issued in U.S. Appl. No. 14/885,973", dated Apr. 19, 2021, 19 Pages.
"Non Final Office Action Issued in U.S. Appl. No. 14/885,970", dated Apr. 28, 2021, 37 Pages.
"Final Office Action Issued in U.S. Appl. No. 14/885,973", dated Nov. 3, 2021, 19 Pages.
"Office Action Issued in European Patent Application No. 16787966.7", dated Dec. 10, 2021, 6 Pages.
"Final Office Action Issued in Chinese Patent Application No. 201680060563.7", dated Dec. 10, 2021, 6 Pages.
"Final Office Action Issued in U.S. Appl. No. 14/885,970", dated Sep. 3, 2021, 38 Pages.
"Non Final Office Action Issued in U.S. Appl. No. 14/885,973", dated Mar. 21, 2022, 21 Pages.
U.S. Appl. No. 14/885,971, filed Oct. 16, 2015.
U.S. Appl. No. 14/885,970, filed Oct. 16, 2015.
U.S. Appl. No. 17/183,229, filed Feb. 23, 2021.
U.S. Appl. No. 14/885,969, filed Oct. 16, 2015.
U.S. Appl. No. 14/885,973, filed Oct. 16, 2015.
"Office Action Issued in European Patent Application No. 16787654.9", dated Apr. 14, 2022, 7 Pages.
Fielding, et al., "Hypertext Transfer Protocol-HTTP/1.1 Status of this Memo", Retrieved From: https://www.rfc-editor.org/rfc/rfc2616.pdf, Jan. 1, 1999, 114 Pages.

\* cited by examiner

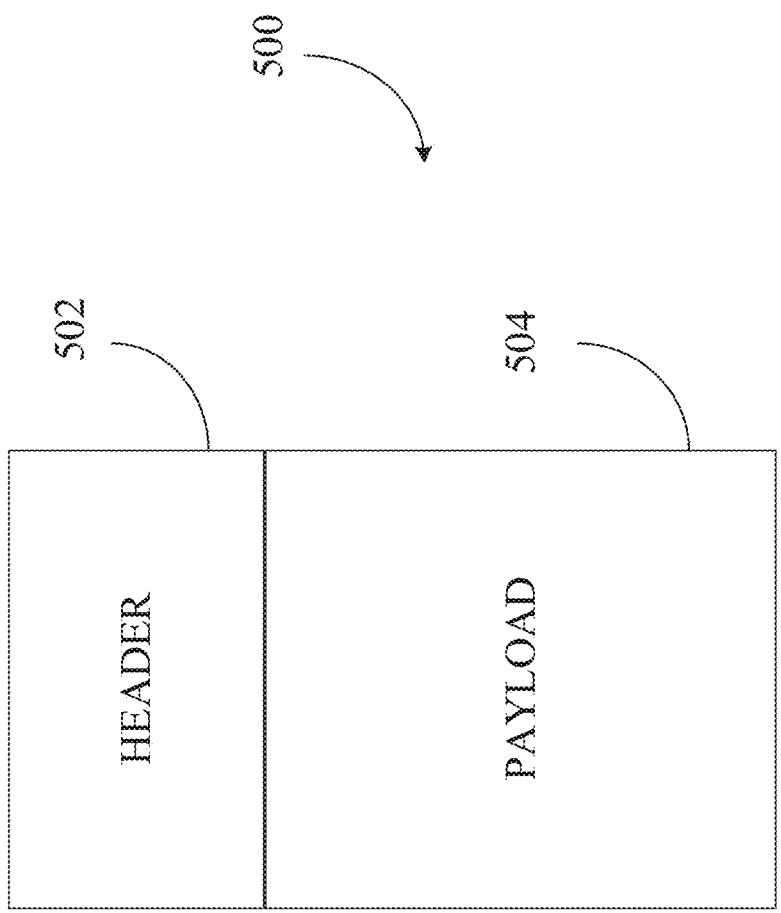

TELEMETRY REQUEST SYSTEM

BACKGROUND

In order to improve the quality of software applications, software developers attempt to understand how the applications perform in the hands of users including customers and clients. While laboratory or development testing, such as debugging and logging, during application development is important in improving quality, laboratory testing alone is seldom sufficient for many modern applications. Modern software applications, especially mobile applications, are highly interactive, and a full range of user interactions are difficult to simulate in a laboratory or during development. Also, a number of environmental conditions effect user experience with applications. For example, network connectivity, GPS-signal quality, and device hardware all vary widely. Some platform APIs can even change behavior depending on the amount of power left in the device battery. These diverse environmental conditions are difficult to reproduce in a laboratory. Thus, many software developers endeavor to collect diagnostic and performance trace data from the field.

Platform support for tracing application performance in the field, however, is typically inadequate. Major platforms, including mobile platforms, provide application crash logs to developers, but developers report difficulty in identifying the causes of crashes from many logs. Further, such data, which may also include unresponsive events and exceptions, does not provide much assistance in detecting performance issues. Analytics frameworks are designed to collect usage analytics such as user demographics rather than performance data. This information typically does not effectively provide information about specific user activity within the application.

Instead, developers that seek meaningful information regarding application performance will include custom tracing code in the application, which is no easy task. For example, even a simple user request in an application triggers multiple asynchronous calls, with complex synchronization between threads, and identifying performance bottlenecks in such code requires correctly tracking causality across asynchronous boundaries. This challenging task is made even more difficult because tracing overhead is preferably kept to a minimum to avoid impact on application performance and also to limit the consumption of scarce resources such as battery and network bandwidth.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A telemetry system, including implementation processes, is described. The telemetry system can communicate with one or more instrumented applications to collect data regarding events from the field and forward correlated and coalesced data to analytics applications for rich analysis. The telemetry system is configured to operate with event definitions having one or more schema sections for declaring and populating data from an event, which is an instantiation of the event definition. The event definition can capture actions or interactions an event author (such as the application developer) wishes to track. The disclosure also includes aspects of a system, method, and computer readable medium for use with a telemetry system that can include automatically, i.e., explicitly, populating a set of fields in a schema of an event definition using a logging library. The set of fields are received via a request message in an application protocol.

An event can include multiple schema sections configured to include data from an event. In the examples, an event definition includes a first section schema having fields that are automatically populated by the logging library without input from an event author such as an application developer. For example, the first section schema can include a system schema for data that is general to all events such as system data. An event can also include a second section schema that includes fields selected by the event author. For example, a domain section schema includes fields that have broad applicability. In one example, an event author can select zero or more domain section schemas, but the event author does not control the name of the fields or the data types of the fields. Instead, the logging library predefines the fields and types in the selected domain schemas and populates the fields with data. The second section schema can further include a custom schema having fields and types defined by the event author that can be applicable to the event but not otherwise included in the system schema and the domain schema. In one example, the first section schema and the domain section schema are not defined with the event; they are common for all events.

An instrumented application can include a telemetry layer. The telemetry layer includes first section schema, or a system schema, that automatically captures common correlating data and can capture information injected with event ingestion components of a telemetry pipeline. The event author can include a second section schema that aligns with the event domain or meaning as well as create fields in a custom schema to include application-specific information related to the event.

A protocol is used to transport schema events between services in the telemetry system. In a method of the pipeline, a session is established between a client and a server using a request-response protocol. The server receives a request message in the client protocol including the payload. The request message can support authorization and upload time as well as other features in a data-interchange format. The server, in one example, provides a response message to the client during the session. By adhering to the protocol, multiple client implementations, service implementations, proxies, and forwarders can participate in the delivery of telemetry items in the telemetry system.

In one example, the telemetry system includes a high-volume, low latency event and telemetry platform. The telemetry system can be applied to drive one or more client and services ecosystems. Example systems or processes of the disclosure are able to unify real-time, interactive, event driven workflows from customer to cloud or computer network and back to customer with comprehensive batch telemetry. A strong common schema, with strongly-typed fixed and flexible data fields to fully describe data enables rich analysis. The systems and processes described provide for application developers to quickly and easily create new instrumentation points with relatively low overhead. The strong common schema provides for data to be efficiently collected across multiple platforms.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

FIG. 5 is a block diagram illustrating an example of a request message for use in the telemetry system of FIG. 2.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
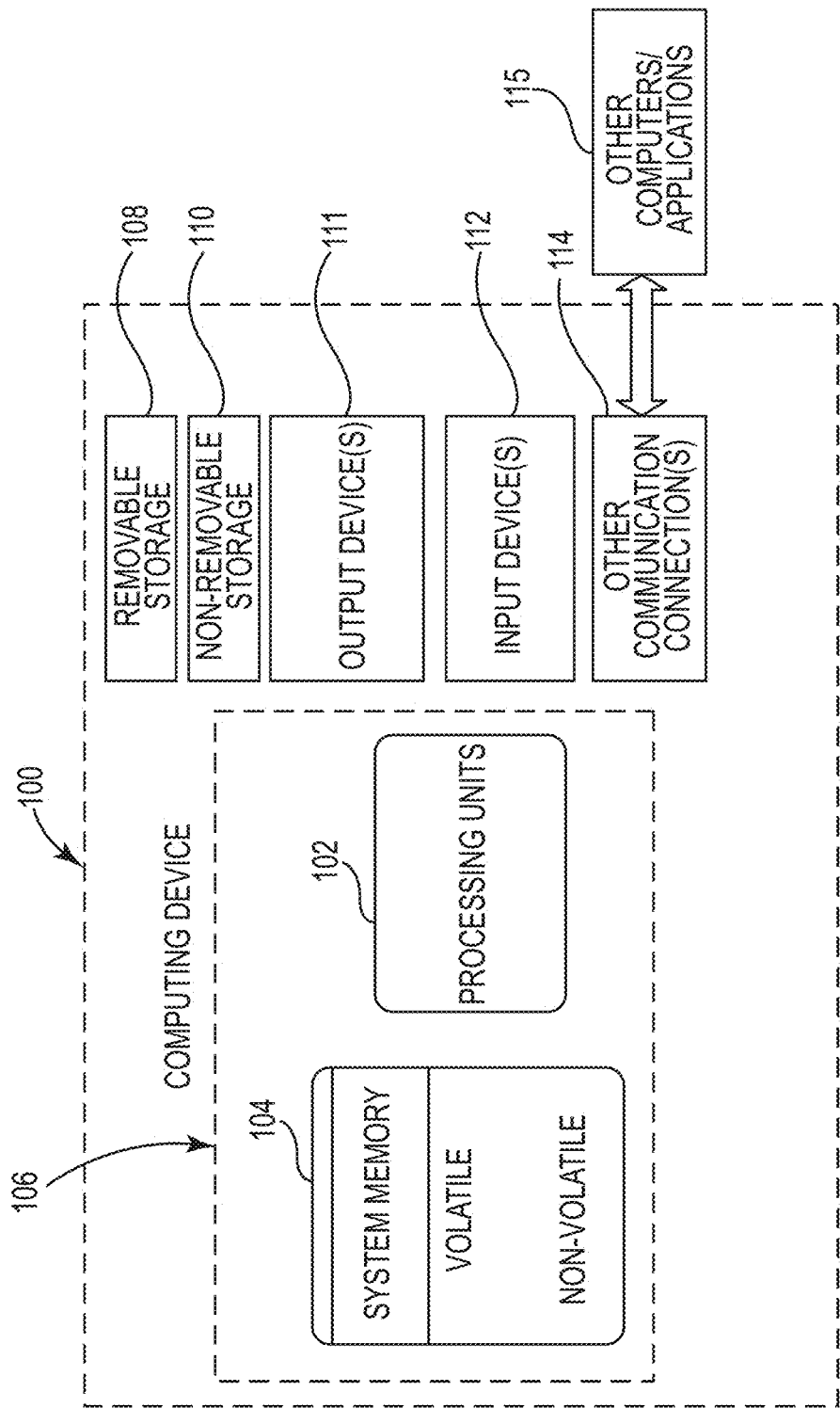
FIG. 1 is a block diagram illustrating an example of a computing device.

FIG. 1 illustrates an exemplary computer system that can be employed in an operating environment and used to host or run a computer application included on one or more computer readable storage mediums storing computer executable instructions for controlling the computer system, such as a computing device, to perform a process. An example of a computer-implemented process includes generation of telemetry data using a telemetry schema that can be stored in a computer memory.

The exemplary computer system includes a computing device, such as computing device 100. In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network, computer cluster, cloud services infrastructure, or other.

Computing device 100 can also have additional features or functionality. For example, computing device 100 may also include additional storage. Such storage may be removable and/or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse), pen, voice input device, touch input device, or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

Figure 2:
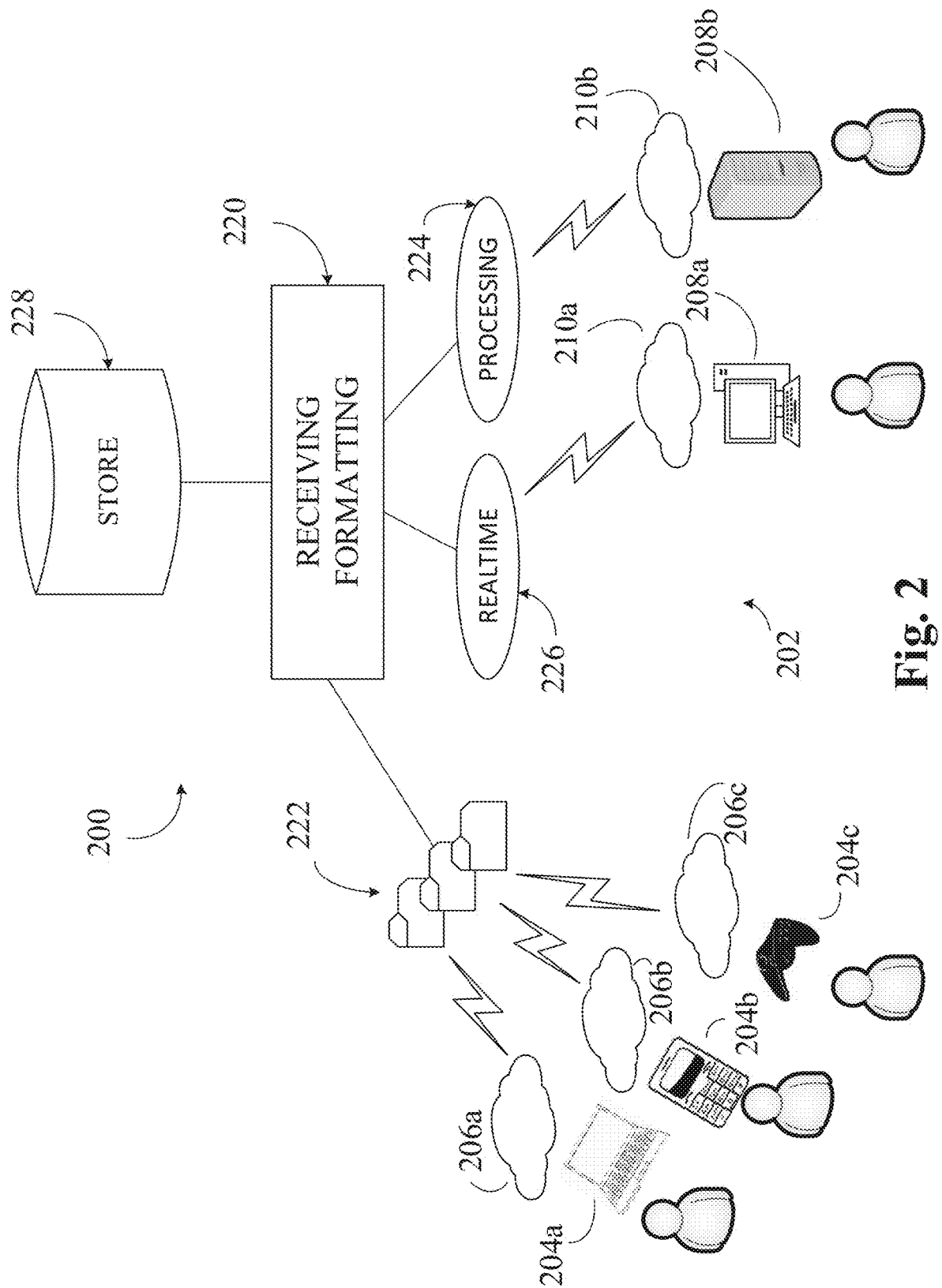
FIG. 2 is a block diagram illustrating an example telemetry system incorporating a computing device of FIG. 1.

FIG. 2 illustrates an example telemetry system 200 that can include one or more computing devices, such as computing device 100, in a computer network 202. For illustration, the example telemetry system 200 can communicate with one or more client computing devices, e.g., client devices 204a-204c, executing instrumented software applications 206a-206c and can also communicate with one or more subscriber devices, e.g., subscriber computing devices 208a-208b, executing analytics software applications 210a-210b. In one example, the client devices 204a-204c and instrumented applications 206a-206c initiate communication with the telemetry system 200 over the network 202.

Instrumentation refers to augmenting an application with code that generates data that can be used to monitor or measure the performance and usage of the application, to diagnose errors, to write trace information, and the like. Programmers implement instrumentation in the form of code instructions that monitor specific components in a system. When an application contains instrumentation code, it can be managed using a management tool to review the performance of the application. Applications can be instrumented for logging and telemetry, which are typically oriented around the internal structure of the application during development and to collect data once the application is released to actual users.

Telemetry is automated remote measurement and data collection. For example, telemetry data can represent information not discoverable during application development such as which configurations customers prefer, how are customers using features in the application, what are the circumstances surrounding errors or crashes, and other information. Telemetry data can include anonymous software versioning information, resource usage, memory access, operating systems in use, and many other examples. Telemetry system 200 provides the tools to collect data and to condense the collected data into analytics, or human-decipherable reports. Telemetry system 200 also makes use of a protocol and metadata.

In some examples, the user of the instrumented applications 206a-206c can determine which telemetry information to provide to a telemetry system 200. For example, the user can select to retain particular information locally, such as personal or sensitive information, and allow other information to be provided to the analytics software application. The user can choose to not upload such information as telemetry data, and the telemetry system 200 will not have access to personal or sensitive data.

Telemetry design leads to events, or actions the instrumentation will track, and applications are typically instrumented to track a series of distinct actions of or interactions with the application. Telemetry instrumentation is provided by event authors, such as application developers or component developers, and in some examples is imposed on event handlers. In one example, an application developer may wish to track several dozen events in an application. An event definition is a description of a specific event, and includes a list of fields set forth in a contract called a schema that can provide a system for declaring and populating structured data in the example. An event includes actual instantiation of a set of data described in the event definition, and this set of data is logged and transmitted to the telemetry system 200. An event is emitted in response to selected actions or interactions, and the data payload of the event, or event payload, describes attributes and semantics about the stimulus that triggered its creation, effects of the event, or both. An event author creates the event definition and the instrumentation code to populate and transmit the event to the telemetry system 200.

Telemetry system 200 includes, for example, a receiving/formatting system 220, logging library 222, processing system 224, real-time system 226, and event store 228. Telemetry data sent by client devices 204a-204c is received at telemetry system 200, which can then forward events to subscriber devices 208a-208b with low latency. Subscribers, using analytics application 210a-210b, can declare filters to receive relevant data. Telemetry system 200 can be configured to operate with one or more schemas of declaring and populating structured or unstructured data. Receiving/formatting system 220 accepts events provided by client devices 204a-204c over the Internet. Logging library 222 uploads data to the receiving/formatting system 220. Receiving/forwarding system 220 can provide data to processing system 224 for rich analytics, batch processing, and reporting. Receiving/forwarding system 220 can also, or alternatively, provide data to real-time system 226 for real-time, or near real-time, indexing, querying, monitoring, and alerting. For example, real-time system 226 can include an operational deadline from event to system response that is greater than instantaneous. Event store 228 can provide reference information about events to the telemetry system 200.

In one example, receiving/forwarding system 220 can be a web service operating on one or more servers on network 202. Telemetry system 200 can further include proxy servers and forwarders, such as Domain Name System (DNS) servers on network 202. Telemetry system 200 can include multiple client implementations and service implementations.

Figure 3:
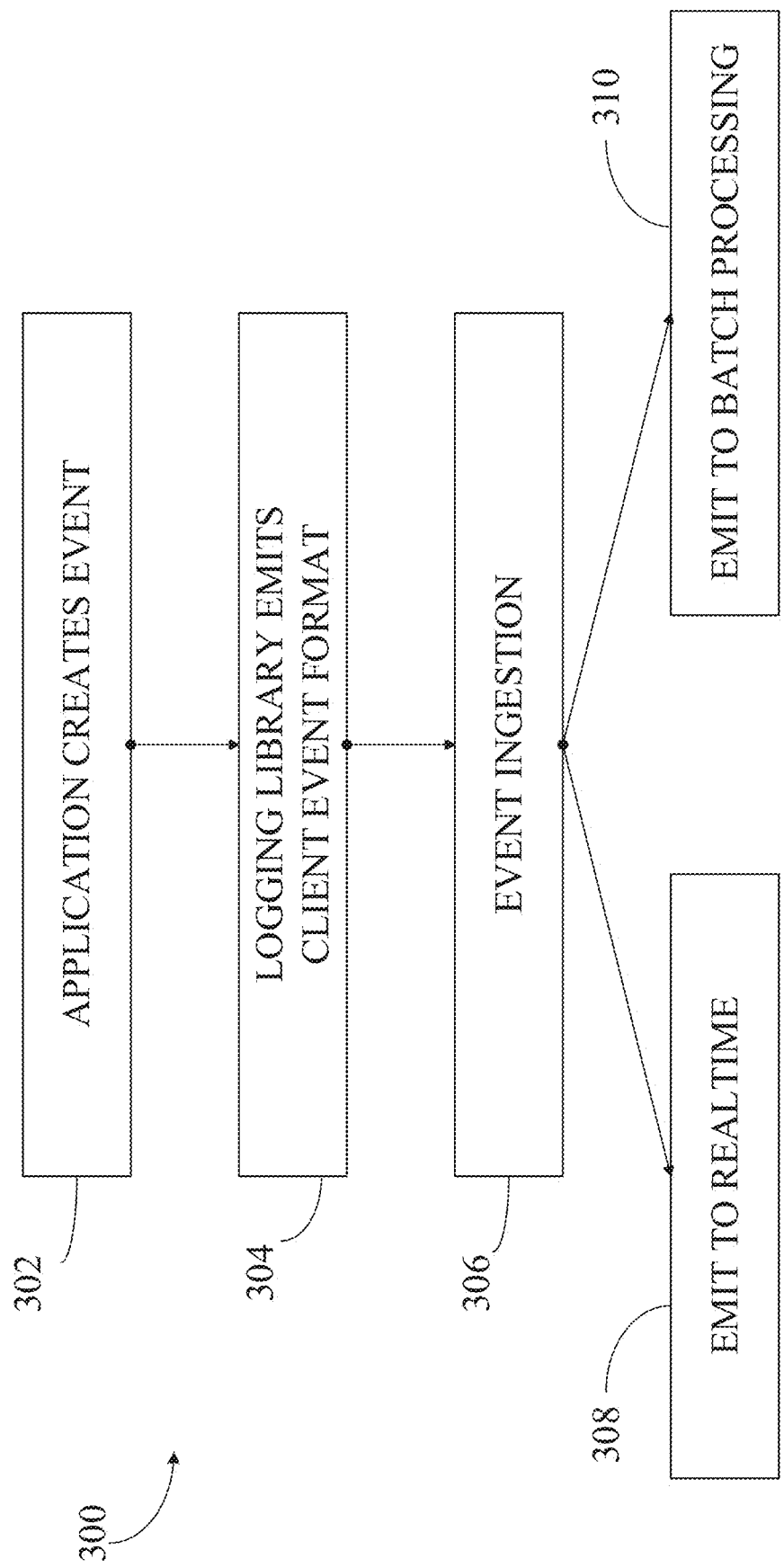
FIG. 3 is a block diagram illustrating an example process of the telemetry system of FIG. 2.

FIG. 3 illustrates a telemetry ingestion pipeline 300 to shuttle events through multiple components of the telemetry system 200. A payload can vary depending on its stage within the pipeline 300. The ingestion pipeline can be implemented as a process in one or more computing devices 100 in telemetry system 200. In the example, an instrumented software application, such as applications 206a-206c, emits an application event format to the logging library 222 at 302. Logging library 222 can include a code library that can, for example, accept an event, serialize data for transport, and upload the event to the receiving/formatting system 220. Logging library 222 can include logging libraries for multiple platforms, such as a Java logging library for the Java platform, an Android logging library for the Android platform, as well as other telemetry clients. A first section schema of an event definition includes a set of fields that are automatically populated with data using a logging library. In some examples, other aspects of the telemetry system 200 can also populate the first set of fields. In some examples, other aspects of the telemetry system 200 can also populate the first set of fields. The event author can select a second set of fields from another schema that are also populated in the pipeline.

Logging library 222 emits a client event format to receiving/formatting system 220 at 304. In one example, the different logging libraries dependent on platform can include a common file format to describe event definitions and a format for serialization. In one example, the format to describe event definitions can include a serialization framework for schematized data such as Bond available from Microsoft, Inc. The file format for serialization of payload can include a data-interchange format such as JavaScript Object Notation, or JSON. Additional data-interchange formats can be used such as line delimited JSON as well as binary serialization format such as a compact serialization in Bond. Receiving/formatting system 220 emits an ingested event format, at 306. Fields of the schema can continue to be populated with data at ingestion. For example, ingestion data can be provided to the first section schema to determine quality of the pipeline. Ingested events can be formatted in JSON and provided to real-time systems, at 308, or batch processing systems, at 310, for example, to allow analytical applications 210a-210b to query for data.

In one example of a method of the pipeline, a session is established between a client and server, such as between instrumented application 206a-206c and receiving/formatting system 220, using a response-request protocol. The client, such as instrumented application 206a-206c, initiates the request by establishing a transport layer protocol, such as Transmission Control Protocol (TCP), connection to a particular port on the server, such as receiving/formatting system 220. Receiving/formatting system 220 listening on the port waits for a client request message. Upon receiving the request message, the server sends back a response message. Client request message includes the event packaged in an event envelope in a defined set of event sections and described in schema defined as list of fields that are composed in an event definition.

Figure 4:
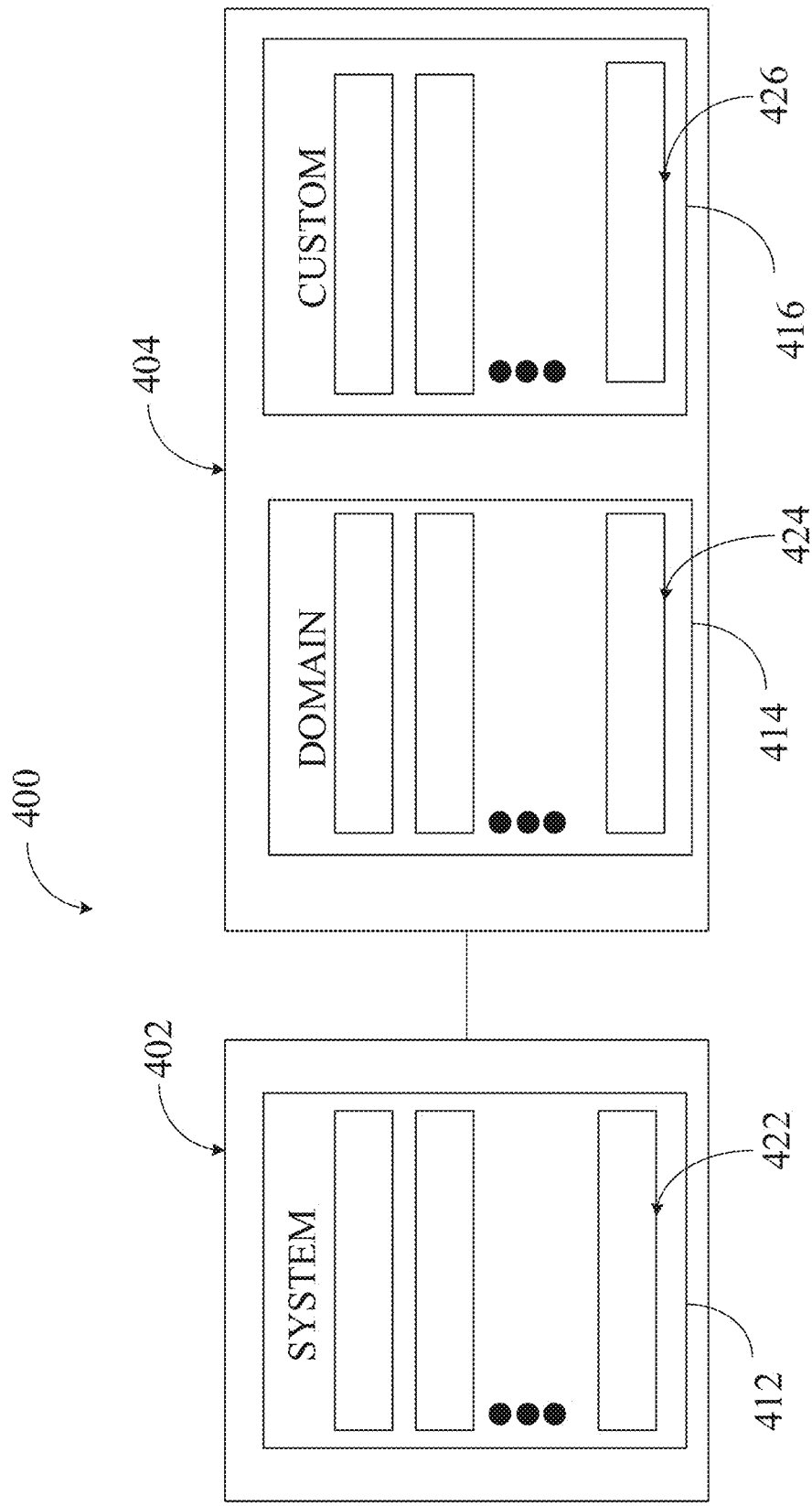
FIG. 4 is a block diagram illustrating an example schema of the telemetry system of FIG. 2.

FIG. 4 illustrates an example event definition 400 for use in telemetry system 200 as a schema, or contract defining a list of fields that are composed into the event definition 400. In the example, event definition includes fields composed into multiple schema sections, referred to in the event definition 400 as a first section schema 402 and second section schema 404. The first section schema 402 in one example include system schema 412 having system fields 422, and second section fields 404 can further include multiple sections such as domain schema 414 having domain fields 424 and custom schema 416 having custom fields 426, which are described in greater detail below. In alternative examples, however, an event may include just fields from the first section 402 and can optionally include fields from the second section 404. In this example, the event definition can optionally include fields from domain schema 414, option include fields from custom schema 416, or, as indicated in event definition 400, fields from both the domain schema 414 and custom schema 416. Event definition 400 can also include annotations that might not appear in the actual event data, such as descriptions, ownership information and field data types. Further, fields can include default values.

Field definitions in the example include a name and a type. Types can include basic data types (such as Boolean, various integer types, floating point numbers, strings), containers (lists, vectors, sets, maps), as well as complex types. In one example, types can be selected from those supported in the serialization framework. Not all complex types, however, supported in the serialization framework may be supported in the data-interchange format. In such cases, complex types in the serialization format can be converted to string type.

The example of an event represented in JSON includes:

```
{
  // First Section Schema (system fields)
  "ver" : <Schema version>,
  "name" : "<Event name>",
  ...
  "data" : {
      // Second Section Schema
      "baseType" : "<Domain Section name>",
      "baseData" : {
          // Domain Section fields
          ...
      },
          // Custom Section fields
          ...
  }
}
```

First section schema 402 includes fields 422 defined by and automatically populated by the logging library 222 present on the local system where events are sent in the pipeline, such as in pipeline 300. In one example, first section schema 402 captures common correlating fields and can relate to the system of the instrumented software application, such as applications 206a-206c, and can represent system data. First section schema 402 can also capture information injected by event ingestion components in pipeline 300. First section schema 402 includes fields typically applicable to all events from the instrumented application, and can include items such as event time, event name, and Internet Protocol address of sender. In some examples, first section schema 402 can include fields 422 the logging library obtains from a caller in addition to values that are automatically filled. In one example, all events use the same first section schema.

First section schema 402 includes fields 422 that are universal and applied to all events that flow through the telemetry system 200, and the design of the schema 402, including the selection of the particular fields 422 to include, can be guided by various principles such as consistent identifiers across diverse applications and platforms such as operating systems as well as care taken to consider the effect on application overhead. First section schema enables correlation and is available for automatic instrumentation using the logging library 222. In one example, the first section schema 402 can include an event envelope semantic and an ingest section.

The event envelope includes a data payload used to transmit event information between components of the pipeline 300. The payload can include the original event and a defined set of event sections. The event envelope semantic can include fields 422 such as schema version, name of the event, time (including date), sample rate, sequence to track order of uploaded events, instrumentation key, flags, device identifier that can be resilient to system builds or hardware replacements, operating system, operating system versions including branch and build information, application identifier, application version, user identifier, and, in some examples, a property bag for custom logging library fields.

The ingest section can be filled at ingestion time. Fields for the ingest section can include time when event was received by the receiving/formatting system 220, the remote address seen by the receiving/formatting system 220 when the event was accepted, event authentication, and event quality.

Second section schema 404 includes optional domain schema 414, custom schema 416, or both. Second section schema 404 includes fields 424, 426 that are populated by code written by the event author rather than the logging library 222. In one example, second section schema 404 include domain schema 414 having predefined fields 424, such as defined by the telemetry system 200 or other centralized groups, and the event author does not control the names of the fields 424 or data type of the fields 424. Custom schema 416 is created by an event author and can be used for scenarios or aspects of events that are application-specific and for which no domain field 424 exists. Templates can be applied to second section schema 404 to support reuse of fields 424, 426 that are commonly defined across several events. In one example, templates are used for domain schema 414. Templates support defining a set of fields that can be consistently reused across multiple event definitions and, in some example, when multiple event definitions include different domain fields 424.

In one example, domain schema 414 is relevant to a particular scenario or aspects of events that are common across many different applications. For example, fields 424 in domain schema 414 can include logging an error, application start event, application end event, web services API (application program interface) call success, API call failure, and many other examples. A wide variety of applications and events can define events from domain schema fields 424 and thus include similar fields and data. Thus, a set of common reports and analytics can be built to consume all events from all applications on platforms that use the same domain schema 414. Event templates are analogous to abstract classes that allow, for example, a centralized group to share a set of fields that several related events include. In one example, domain fields 424 can be late-bound and chosen when the event is defined.

Domain schemas 414 are generalized to enable broad applicability. For example, a domain schema MediaUsage can exist rather than more specific domain schemas such as play song, stop song, play video, stop video, Or the like, which are more specific but use a schema per media player, for example.

Custom schema 416 is created and defined by the event author. In one example, the event author can determine the name and data type of the custom fields 426. The event author is also responsible for populating the custom fields 426 when an event is instantiated. An event defined without a domain schema can be inherited from a base to give the event only custom fields 426.

A client protocol is used to transport schema events 400 between services in the telemetry system 200 that support telemetry events. Data payloads in the schema event parts 400 can be transferred between components in the pipeline 300, such as between a telemetry layer in the instrumented application 206a-206c and the receiving/formatting system 220, in a request-response protocol in a client-server model. One example of a request-response protocol for use with pipeline 300 in system 200 includes an application protocol. Examples of application protocols include hypertext transfer protocol, or HTTP, which includes sessions having request-response transactions, as well as SPDY, HTTP/2 (HTTP/2.0), WebSocket, and other protocols. In one example, the client submits an HTTP request to the server, and telemetry items can be exchanged via HTTP having a JSON payload. The server provides a response message to the client. The response can include status information about the request.

FIG. 5 illustrates a request message 500 in the client protocol. The request message includes a header 502 and payload 504. Payload 504 includes one or more telemetry events. In the example, the header 502 can support authentication, upload time, and type and encoding information. For example, the header 502 can include an "Authentication" header that would include an item such as an authentication token accepted by the server. The authentication token can identify the user, the computing device or the program that originated the events in the request message. The header 502 can also include an "X-Upload Time" an HTTP extension header. The client can set this value via universal coordinated time (ISO-8601) at moment of upload of data, and the time information can be applied at the server side to detect significant clock difference. The header 502 can also include header information regarding type and encoding. The server can be configured to support one or more types and encoding. Types can be various media types such as application/json (JSON) and application/x-json-stream (line delimited JSON), and other media types. Common encoding can include gzip compression, deflate compression, and other HTTP compression or other compression forms. An "Accept-Encoding" header describes the form of encoding, such as gzip compression or deflate compression, of the request. A "Content-Encoding" header describes the provided compression, such as gzip, of the content in the request. A "Content-Type" header describes the media type of the content. Header 502 can include other HTTP headers or other headers.

In order to efficiently and reliably send telemetry in system 200, client protocol can include certain request constraints. Request constraints can include limits on size of the request, the number of events per request, and the size of the events. In one example, a request size can be limited to not exceed 4 MB per request, the number of events per request can be limited to not exceed five-hundred events, and the event size can be limited to not exceed 64 KB per event. In such a configuration, the request size limits the number of maximum sized events to less than the system maximum of events per request. Request constraints typically affect the number of domain fields 424 and custom fields 426 in each event.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of operating a telemetry system to collect telemetry data of an instrumented application, the method comprising:
   automatically populating a first set of fields in a schema of an event definition with telemetry data using a logging library of the telemetry system; and
   receiving the set of fields via a request message in an application protocol, the request message including:
      a header to support authentication, upload time, and type and encoding information;
      a payload including the event packaged in an event envelope in a defined set of event sections and described in the schema defined as list of fields that are composed in the event definition, the defined set of event sections including an ingest section to be filled at an ingestion time.

2. The method of claim 1 comprising:
   populating a second set of fields in the schema selected by an event author.

3. The method of claim 2 wherein populating the second set of fields includes preselected fields from the telemetry system.

4. The method of claim 3 wherein the preselected fields are populated with data common to a plurality of applications.

5. The method of claim 2 wherein populating the second set of fields includes custom fields from the event author.

6. The method of claim 5 wherein the custom fields include custom name and custom data type.

7. The method of claim 1 wherein the set of fields is automatically populated with data common to all events.

8. The method of claim 7 wherein the data common to all events includes client system data.

9. The method of claim 1 wherein the request message includes a payload having the set of fields and a header.

10. The method of claim 9 wherein the payload is included in a data-interchange format.

11. The method of claim 9 wherein the application protocol is hypertext transfer protocol.

12. A telemetry system, comprising:
   a computing device including a processor and a memory configured to:
      automatically populate a set of fields in a schema of an event definition with telemetry data using a logging library of the telemetry system; and receive the set of fields via a request message in an application protocol, the request message including:
  a header to support authentication, upload time, and type and encoding information;
  a payload including the event packaged in an event envelope in a defined set of event sections and described in the schema defined as list of fields that are composed in the event definition, the defined set of event sections including an ingest section to be filled at an ingestion time.

13. The telemetry system of claim 12 wherein the computing device is configured to:
  populate a second set of fields in the schema selected by an event author.

14. The telemetry system of claim 12 wherein the request message includes a payload having the set of fields and a header.

15. The telemetry system of claim 14 wherein the payload is included in a data-interchange format.

16. The telemetry system of claim 12 including constraints on request size, number of events, and event size.

17. The telemetry system of claim 12 including proxies and forwarders.

18. A computer readable storage medium, which does not include a transitory propagating signal, storing computer executable instructions for controlling a computing device to perform a method comprising:
  automatically populating a first set of fields in a schema of an event definition with telemetry data using a logging library of the telemetry system; and
  receiving the set of fields via a request message in an application protocol, the request message including:
    a header to support authentication, upload time, and type and encoding information;
    a payload including the event packaged in an event envelope in a defined set of event sections and described in the schema defined as list of fields that are composed in the event definition, the defined set of event sections including an ingest section to be filled at an ingestion time.

19. The computer readable storage medium of claim 18 wherein an event is in the request message represented in a data-interchange format.

20. The computer readable storage medium of claim 19 wherein the data-interchange format is JSON or line delimited JSON.

* * * * *